United States Patent Office 3,087,937
Patented Apr. 30, 1963

3,087,937
BIS(PERFLUOROMETHYL)PHOSPHINIC NITRIDE
Giorgio Tesi, Catherine M. Douglas, and Charles P. Haber, Riverside, Calif., assignors to the United States of America as represented by the Secretary of the Navy
No Drawing. Filed Mar. 22, 1961, Ser. No. 97,700
2 Claims. (Cl. 260—349)
(Granted under Title 35, U.S. Code (1952), sec. 266)

The invention herein described may be manufactured and used by or for the Government of the United States of America for governmental purposes without the payment of any royalties thereon or therefor.

The present invention relates to a low melting polymeric material which is thermally stable, inert to acids and other oxidizing agents and appropriate for use as a fluid under high temperature operating conditions, and more particularly to a novel phosphorous, nitrogen, carbon and fluorine containing product, namely polymeric bis(perfluoromethyl)phosphinic nitride.

Previous attempts were made to prepare bis(perfluoromethyl)phosphinic nitride by reacting bis(perfluoromethyl)trichlorophosphorus with either ammonia or ammonium chloride but were unsuccessful. The present material, $(CF_3)_2PN$ polymer, made by the present synthesis, is new and has not been synthesized previously by any method.

It is an object of the present invention, therefore, to provide a novel phosphorus, nitrogen, carbon and fluorine containing product that is thermally stable at high temperatures and possesses chemical inertness to acids and oxidizing agents.

It is another object of the invention to provide a low melting polymeric material that is thermally stable, inert to acids and other oxidizing agents and appropriate for use as a fluid under high temperature operating conditions.

Still another object of the invention is to provide a new and useful compound, polymeric bis(perfluoromethyl)-phosphinic nitride.

A further object of the invention is to provide the synthesis of polymeric bis(perfluoromethyl)phosphinic nitride.

Other objects and many of the attendant advantages of this invention will become readily appreciated as the same becomes better understood by reference to the following detailed description:

In the preparation of the present compound, the problem of preparing material corresponding to the formula $[(CF_3)_2PN]_n$ was approached by reacting $(CF_3)_2PCl$ with $LiN_3$, as shown in the following equations:

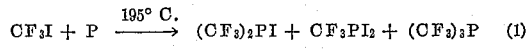
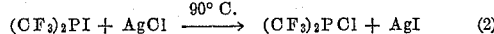
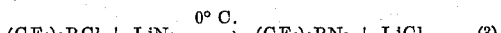
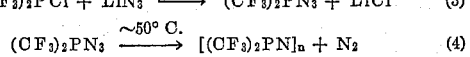

When chlorobis(trifluoromethyl)phosphine, produced by the reaction of Equation 2, was treated with lithium azide at 0° C., Equation 3, for 24 hours, a smooth reaction took place and distillation in vacuo then yielded about 70% of bis(perfluoromethyl)phosphinic azide.

Reaction 3 was thoroughly investigated under a variety of conditions and the formation of a stable bis(perfluoromethyl)phosphinous azide has been accomplished. This azide (Found: P, 14.5; $CF_3$ as fluoroform, 65.1; N, 19.7%; molecular weight 211. $C_2F_6N_3P$ requires P, 14.7; $CF_3$, 65.4; N, 19.9%; molecular weight 211.0) solidifies in liquid nitrogen to a glass. Vapour pressures of about 1 mm. at −60° C. and 57 mm. at 0° C. have been observed. The infrared absorption spectrum has a strong sharp peak at $4.7\mu$ typical of the azide group. Absorption in the region $8.0.9.0\mu$ is typical of the C–F stretching vibration for the compounds $(CF_3)_2PX$. Acid treatment of the residue from alkaline hydrolysis of the azide liberated hydrazoic acid which was identified by its infrared spectrum in $CCl_4$. Although reasonably stable at 0° C., $(CF_3)_2PN_3$ decomposes slowly at room temperature. However, the azide compound in some respects is unpredictable and due care must be taken in handling the compound for on several occasions, without apparent reasons, violent explosions occurred, even once at liquid-nitrogen temperature.

Slow decomposition of the azide, Equation 4, at 50–60° C./37 mm. yielded the calculated amount of nitrogen:

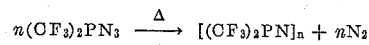

During this experiment a white, waxy material, together with white needle-shaped crystals, was formed on the walls of the container. The white, waxy material obtained had a melting point of 90–94° C. (Found: C, 12.7; N, 7.5; P, 16.1. $C_2F_6NP$ requires C, 13.1; N, 7.6; P, 16.0) and was insoluble in all the usual organic solvents. X-ray analysis by diffractometer showed a completely amorphous pattern. Refluxing this material with sulphuric, nitric, or perchloric acid did not appear to affect the composition. Treatment with 10% sodium hydroxide solution resulted in partial hydrolysis, with liberation of one mole of fluoroform per $(CF_3)_2PN$ unit.

The azide, $(CF_3)_2PN_3$, is the first example known of an azido group bonded with a tri-valent phosphorous, and the polymeric material, $[(CF_3)_2PN]_n$, is the first example of a polymeric phosphinic nitride having perfluoro alkyl groups as substituents of the phosphorus.

Obviously many modifications and variations of the present invention are possible in the light of the above teachings. It is therefore to be understood that within the scope of the appended claims the invention may be practiced otherwise than as specifically described.

What is claimed is:
1. A white, waxy, amorphous, polymeric material having the recurring structural unit

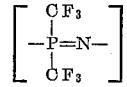

having a melting point of 90–94° C., being insoluble in organic solvents, and produced by the reaction of chloro-(bistrifluoromethyl)phosphine with lithium azide at 0° C. for 24 hours to yield bis(perfluoromethyl)phosphinic azide which was purified by distillation in vacuo, and subsequent decomposition of the bis(perfluoromethyl)phosphinic azide at 50–60° C. yielding nitrogen and said white, waxy, amorphous, polymeric material.

2. A compound of the formula: $(CF_3)_2PN_3$.

References Cited in the file of this patent

Kosolapoff: "Organo Phosphorus Compounds," pages 49, 54—5 (1950) (Wiley).
Harris, J. Chem. Soc., pages 512–519 (1958).
Cram and Hammond: "Organic Chemistry," page 215 (1959) (McGraw-Hill).